United States Patent
Nakaya et al.

(10) Patent No.: US 8,428,078 B2
(45) Date of Patent: Apr. 23, 2013

(54) COMMUNICATION SYSTEM INCLUDING CORRELATION INFORMATION CORRELATING AREA AND TRANSMISSION RESOURCE

(75) Inventors: Yuuta Nakaya, Kawasaki (JP); Ichiro Iida, Kawasaki (JP); Nobutsugu Fujino, Kawasaki (JP); Makoto Yoshida, Kawasaki (JP); Mamoru Machida, Kawasaki (JP); Masayoshi Moriya, Kawasaki (JP); Kazumasa Ushiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 12/835,456

(22) Filed: Jul. 13, 2010

(65) Prior Publication Data
US 2011/0026543 A1 Feb. 3, 2011

(30) Foreign Application Priority Data
Jul. 28, 2009 (JP) ................... 2009-175331

(51) Int. Cl.
*H04J 3/16* (2006.01)
*H04W 24/00* (2009.01)
*G06F 15/173* (2006.01)

(52) U.S. Cl.
USPC .......... 370/437; 455/456.1; 709/226

(58) Field of Classification Search .......... None
See application file for complete search history.

(56) References Cited

U.S. PATENT DOCUMENTS

| | | | |
|---|---|---|---|
| 5,442,805 A | 8/1995 | Sagers et al. | |
| 6,744,745 B1 * | 6/2004 | Fukui | 370/320 |
| 2004/0085909 A1 * | 5/2004 | Soliman | 370/252 |
| 2004/0230373 A1 * | 11/2004 | Tzamaloukas | 701/208 |
| 2005/0164716 A1 * | 7/2005 | Kawamoto | 455/457 |
| 2005/0197748 A1 * | 9/2005 | Holst et al. | 701/3 |
| 2005/0213602 A1 * | 9/2005 | Redi | 370/445 |
| 2007/0117525 A1 * | 5/2007 | Osafune | 455/99 |
| 2007/0213046 A1 * | 9/2007 | Li et al. | 455/425 |
| 2008/0013469 A1 * | 1/2008 | Eves | 370/310 |

(Continued)

FOREIGN PATENT DOCUMENTS

| | | |
|---|---|---|
| DE | 101 37 138 | 3/2003 |
| EP | 1 037 482 | 9/2000 |

(Continued)

OTHER PUBLICATIONS

New IT reform strategy—Society where the benefits of IT is realized anytime, anywhere, by anyone; Jan. 19, 2006; URL:http://www.kantei.go.jp/jp/singi/it2/kettei/060119honbun.pdf; [Partial Translation: From p. 19, line 1 to p. 20, Bottom attached].

Kyoto protocol target achievement plan; Apr. 28, 2005; URL:http://www.kantei.go.jp/jp/singi/ondanka/kakugi/050428keikaku.pdf [Partial Translation: p. 14, Table 3].

(Continued)

*Primary Examiner* — Timothy J Weidner
(74) *Attorney, Agent, or Firm* — Myers Wolin, LLC

(57) ABSTRACT

A mobile communication apparatus includes a storage unit that stores therein correspondence information correlating area and transmission resource; an area deducing unit that deduces in which area the mobile communication apparatus is located; a selecting unit that selects the transmission resource correlated, in the correlation information stored by the storage unit, with the area deduced by the area deducing unit; and a transmitter that using the transmission resource selected by the selecting unit, transmits data to a second mobile communication apparatus.

16 Claims, 10 Drawing Sheets

U.S. PATENT DOCUMENTS

| | | | |
|---|---|---|---|
| 2008/0037577 A1 | 2/2008 | Nagura | |
| 2008/0095163 A1* | 4/2008 | Chen et al. | 370/392 |
| 2009/0010268 A1* | 1/2009 | Giacomazzi et al. | 370/400 |
| 2009/0167513 A1* | 7/2009 | Hill et al. | 340/435 |
| 2010/0019937 A1* | 1/2010 | Mori et al. | 340/936 |
| 2010/0080168 A1* | 4/2010 | Fukuyama | 370/328 |
| 2012/0134336 A1* | 5/2012 | Nakaya et al. | 370/330 |

FOREIGN PATENT DOCUMENTS

| | | |
|---|---|---|
| EP | 1 571 861 | 9/2005 |
| JP | 2002-064858 | 2/2002 |
| JP | 2006-221286 | 8/2006 |
| JP | 2006-311409 | 11/2006 |
| JP | 2008-011343 | 1/2008 |
| JP | 2008-092196 | 4/2008 |
| JP | 2008-092197 | 4/2008 |

OTHER PUBLICATIONS

Japanese Patent Office "Notice of Rejection" issued for corresponding Japanese Patent Application No. 2009-175331, mailed Jul. 12, 2011. English translation attached.

Japanese Patent Office "Notice of Rejection" issued for corresponding Japanese Patent Application No. 2009-175331, mailed Apr. 19, 2011. English translation attached.

Extended European Search Report issued for corresponding European Patent Application No. 10170536, issued Jan. 27, 2011.

Katragadda S. et al; "A decentralized location-based channel access protocol for inter-vehicle communication"; VTC 2003-Spring; The 57th IEEE Semiannual Vehicular Technology Conference; Proceedings Jeju, Korea, Apr. 22-25, 2003;[IEEE Vehicular Technology Conference] New York, NY: IEEE, US, vol. 3, Apr. 22, 2003, pp. 1831-1835, XP010862430.

* cited by examiner

| AREA | TRANSMISSION RESOURCE |
|---|---|
| COORDINATE RANGE E1 | R1 |
| COORDINATE RANGE E2 | R2 |
| ⋮ | ⋮ |
| COORDINATE RANGE EN | RN |

300 m / 300 m 900 m / 900 m

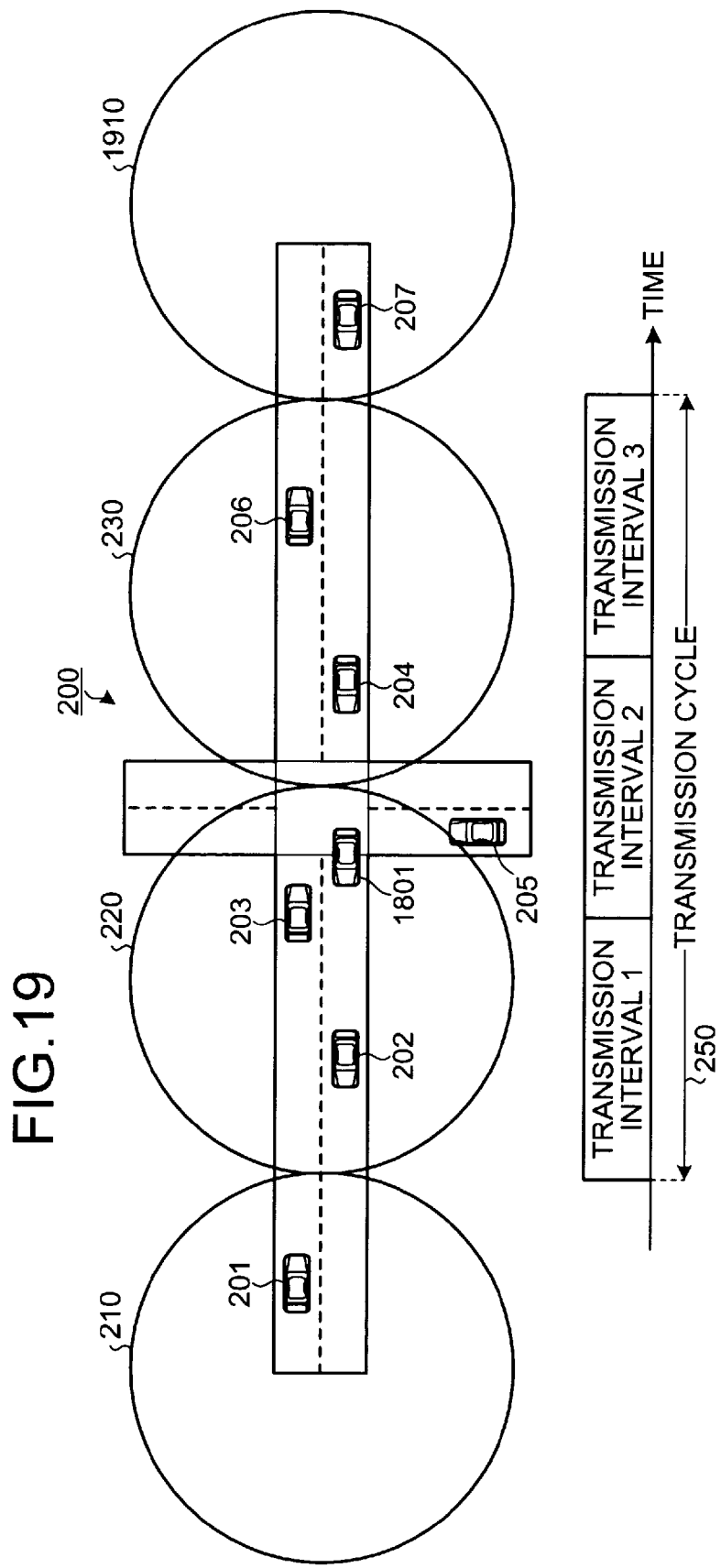

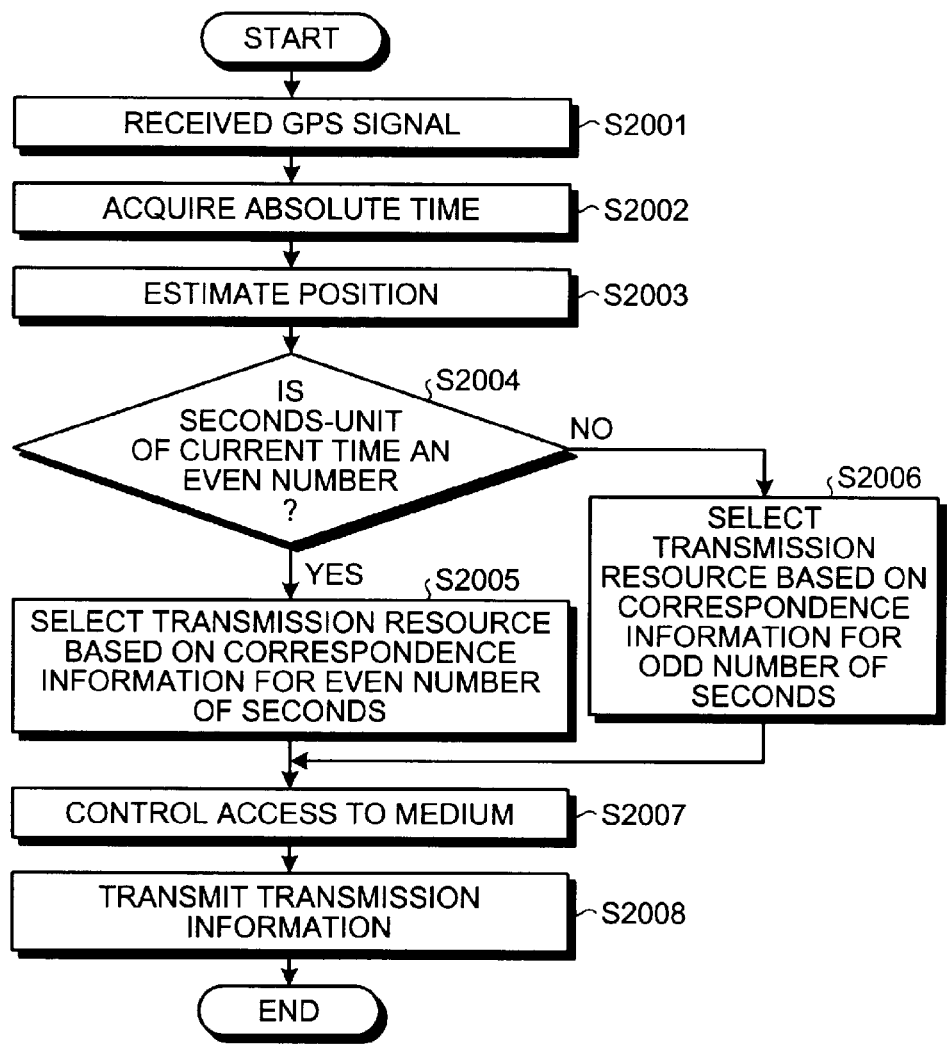

COMMUNICATION SYSTEM INCLUDING CORRELATION INFORMATION CORRELATING AREA AND TRANSMISSION RESOURCE

CROSS REFERENCE TO RELATED APPLICATIONS

This application is based upon and claims the benefit of priority of the prior Japanese Patent Application No. 2009-175331, filed on Jul. 28, 2009, the entire contents of which are incorporated herein by reference.

FIELD

The embodiments discussed herein are related to a mobile communication apparatus, a communication method, and a communication system.

BACKGROUND

Presently, motorized societies are facing many problems that continue to worsen, such as the deterioration of living environs caused by traffic accidents, traffic congestion, hazardous substances, noise, etc. Intelligent transport systems (ITS) are one way to solve these problems. Vehicle Information and Communication Systems (VICS), electronic toll collection (ETC), etc. are also being put into use.

Amid such circumstances, inter-vehicle communication systems that perform wireless communication between vehicles have attracted attention, particularly in terms of safety and peace of mind. Rather than centralized management control of terminals performed by a cellular system base station, autonomous decentralized control by each vehicle (cellular terminal) performing communication is demanded of such inter-vehicle communication systems.

Thus, as a conventional control scheme for inter-vehicle communication, a Carrier Sense Multiple Access/Collision Avoidance (CSMA/CA) algorithm exists (for example, refer to Japanese Laid-Open Patent Publication No. 2008-92197). Under the CSMA/CA algorithm, vehicles transmit data after a confirmation (carrier sense) of the availability of a communication channel (propagation channel) for a given period of time.

Under the conventional technique above, however, vehicles separated by a distance that does not enable carrier sensing may simultaneously transmit data, whereby the transmitted data collides (packet collision), i.e., hidden node problem. If data collision occurs, the data cannot be decoded properly on the receiving side, arising in a problem of data loss.

Further, although Request to Send/Clear to Send (RTS/CTS) is one measure to address the problem of hidden nodes, if the size of the data to be transmitted is relatively small, as with inter-vehicle communication, use of RTS/CTS results in increased overhead. Thus, a problem of reduced communication efficiency arises.

SUMMARY

According to an aspect of an embodiment, a mobile communication apparatus includes a storage unit that stores therein correspondence information correlating area and transmission resource; an area deducing unit that deduces in which area the mobile communication apparatus is located; a selecting unit that selects the transmission resource correlated, in the correlation information stored by the storage unit, with the area deduced by the area deducing unit; and a transmitter that using the transmission resource selected by the selecting unit, transmits data to a second mobile communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a diagram depicting area modification by time slots.

FIG. 20 is a flowchart of an example of operations performed by the mobile communication apparatus according to a third embodiment.

FIG. 21 is a diagram of an example of correspondence information according to the third embodiment.

DESCRIPTION OF EMBODIMENTS

Embodiments of the present invention will be explained with reference to the accompanying drawings.

Figure 1:
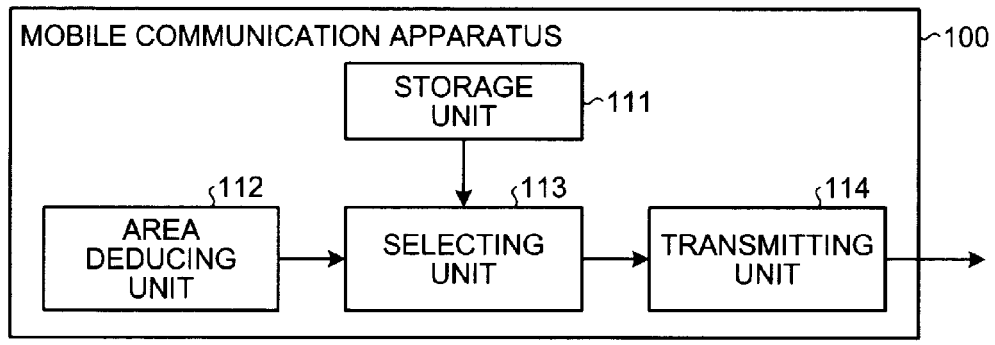
FIG. 1 is a block diagram of a mobile communication apparatus according to a first embodiment.

FIG. 1 is a block diagram of a mobile communication apparatus according to a first embodiment. As depicted in FIG. 1, a mobile communication apparatus 100 according to the first embodiment includes a storage unit 111, an area
} deducing unit 112, a selecting unit 113, and a transmitting unit (transmitter) 114. The mobile communication apparatus 100, for example, is equipped on a mobile object such as a vehicle or a mobile telephone and directly communicates wirelessly with other mobile communication apparatuses (direct, autonomous control). The mobile communication apparatus 100 may have a further function of wireless communication through a base station.

The storage unit 111 stores therein correspondence information (for example, refer to FIGS. 8, 21) correlating areas and transmission resources. An area is, for example, an area demarcating, by coordinates, a road along which a mobile vehicle equipped with the mobile communication apparatus 100 travels. A transmission resource is a physical resource (wireless carrier) for data transmitted by the mobile communication apparatus 100.

For example a transmission resource is a period of time, a frequency, or a code for code division. Transmission resources are preliminarily determined for each area and the storage unit 111 stores therein correspondence information correlating the areas and the transmission resources. The storage unit 111 may be implemented by a memory equipped to the mobile communication apparatus 100.

The area deducing unit 112 deduces in which area the mobile communication apparatus 100 is located. The area deducing unit 112 may be implemented by a global positioning system (GPS). The area deducing unit 112 informs the selecting unit 113 of the deduced area.

The selecting unit 113 reads the correspondence information stored by the storage unit 111 and selects the transmission resource that, in the read correspondence information, is correlated with the area reported by the area deducing unit 112. The selecting unit 113 informs the transmitting unit 114 of the selected transmission resource. The selecting unit 113 may be implemented by computing means such as a digital signal processor (DSP).

The transmitting unit 114, using the transmission source selected by the selecting unit 113, transmits data to another mobile communication apparatus. The transmitting unit 114 may be implemented by, for example, a wireless communication interface, such as an antenna, a communication circuit, etc.

According to the configuration above, the mobile communication apparatus 100 is able to deduce the area in which the mobile communication apparatus 100 is located as well as select and use a transmission resource preliminarily correlated with the deduced area. Thus, the mobile communication apparatus 100 is able to autonomously select and use transmission resources that differ according to area. Consequently, for example, even if transmission resources for the mobile communication apparatuses 100 are not managed by a base station, communication loss caused by hidden nodes can be reduced.

Figure 2:
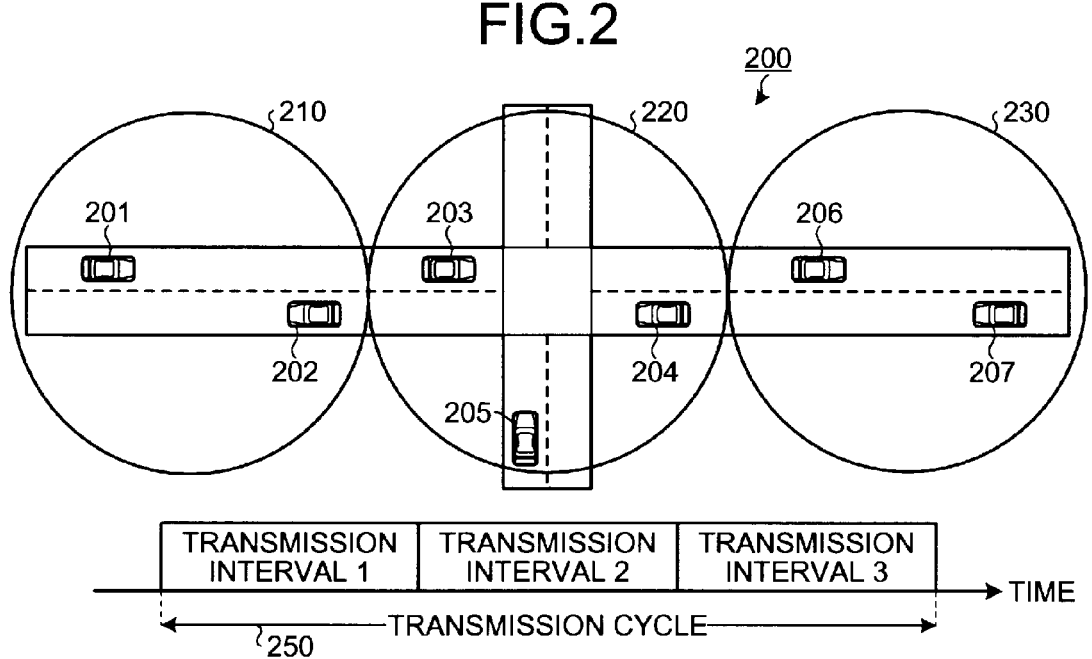
FIG. 2 is a diagram of an example of correlation between areas and transmission resources.

FIG. 2 is a diagram of an example of correlation between areas and transmission resources. In a communication system 200 depicted in FIG. 2, a road is demarcated by areas 210, 220, 230. The area 210 and the area 220 are adjacent to one another; the area 220 and the area 230 are adjacent to one another; whereas, the area 210 and the area 230 are not adjacent to one another and thus, a vehicle in the area 210 and a vehicle in the area 230 are hidden nodes with respect to one another.

Vehicles 201 and 202 are located in the area 210; vehicles 203 to 205 are located in the area 220; and vehicles 206 and 207 are located in area 230. The vehicles 201 to 207 are equipped respectively with the mobile communication apparatus 100 depicted in FIG. 1.

A transmission cycle 250 indicates 1 cycle of the transmission cycle for data of the communication system 200. In the transmission cycle 250, time is indicated along the horizontal axis. In the communication system 200, the transmission cycle 250 is divided into 3 transmission intervals 1, 2, and 3. In the correlation information stored in the storage unit 111 depicted in FIG. 1, the areas 210, 220, and 230 are respectively correlated with the transmission intervals 1, 2, and 3.

For example, the apparatus equipped on the vehicle 202 deduces that the vehicle 202 is located in the area 210 and selects a transmission interval 1 correlated, in the correlation information, with the deduced area 210. During the selected transmission interval 1, the vehicle 202 transmits data. Further, the apparatus equipped on the vehicle 206 deduces that the vehicle 206 is located in the area 230 and selects a transmission interval 3 correlated, in the correlation information, with the deduced area 230. During the selected transmission interval 3, the vehicle 206 transmits data.

Thus, for example, the vehicle 203, which is in the area 220, is able to receive via different transmission intervals, data transmitted from the vehicle 202 and data transmitted from the vehicle 206. Data transmitted from the vehicle 202, the vehicle 206, etc. is information indicative of, for example, vehicular location, direction of travel, speed, and the state of the accelerator, brakes, turn signals, etc. Here, although an example has been described where the transmission cycle 250 is divided into 3 transmission intervals 1, 2, and 3, the number of divisions of the transmission cycle 250 is arbitrary.

In this way, in the correspondence information, areas in which hidden-node mobile communication apparatuses are located (areas 210 and 230) are respectively correlated with different transmission resources (transmission resource 1 and transmission resource 3).

Consequently, without execution of carrier sensing between the vehicles in each of the areas 210 and 230, each vehicle in the area 220 is able to receive via different transmission resources, data transmitted from vehicles in the area 230. Therefore, vehicles in the area 220 are able to properly decode data from vehicles in the area 210 and from vehicles in the area 230. Consequently, communication loss caused by hidden nodes can be reduced.

In the correspondence information, even if areas are adjacent to a common area (area 220), the areas may be correlated with the same transmission resource. Vehicles located in these areas are each able to execute carrier sensing and thus, by controlling medium access, data can be transmitted such that data collisions do not occur.

Figure 3:
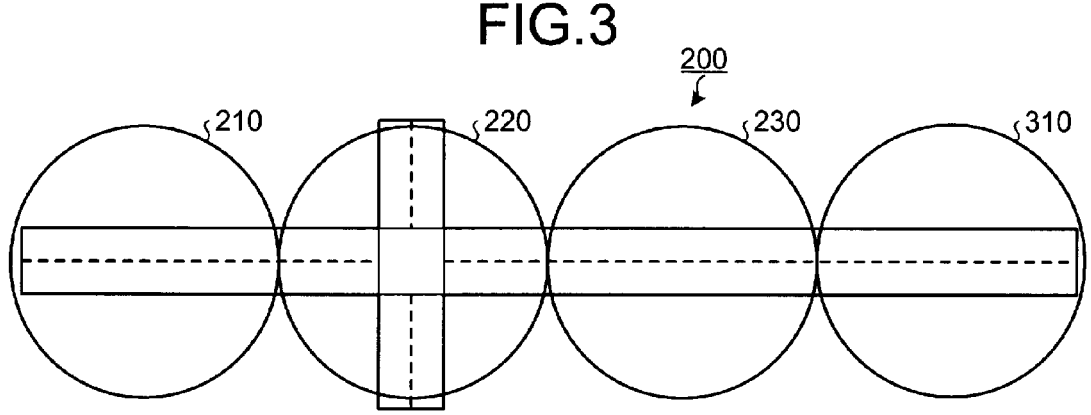
FIG. 3 is a diagram of an example of the same transmission resource being correlated with multiple areas.

FIG. 3 is a diagram of an example of the same transmission resource being correlated with multiple areas. In FIG. 3, portions identical those depicted in FIG. 2 are given the same reference numerals used in FIG. 2 and description therefor is omitted. An area 310 is far enough away from the area 210 such that radio wave interference between the areas 320 and 210 does not occur (can be disregarded). In this case, the area 310 may be correlated with the same transmission resource (transmission resource 1) correlated with the area 210.

For example, areas (areas 210 and 310) that are not adjacent to a common area may be correlated with the same transmission resource (transmission resource 1). Consequently, reductions in communication loss caused by hidden nodes and the use of the same transmission resource in multiple areas become possible, thereby improving the efficiency of transmission resource utilization.

Figure 4:
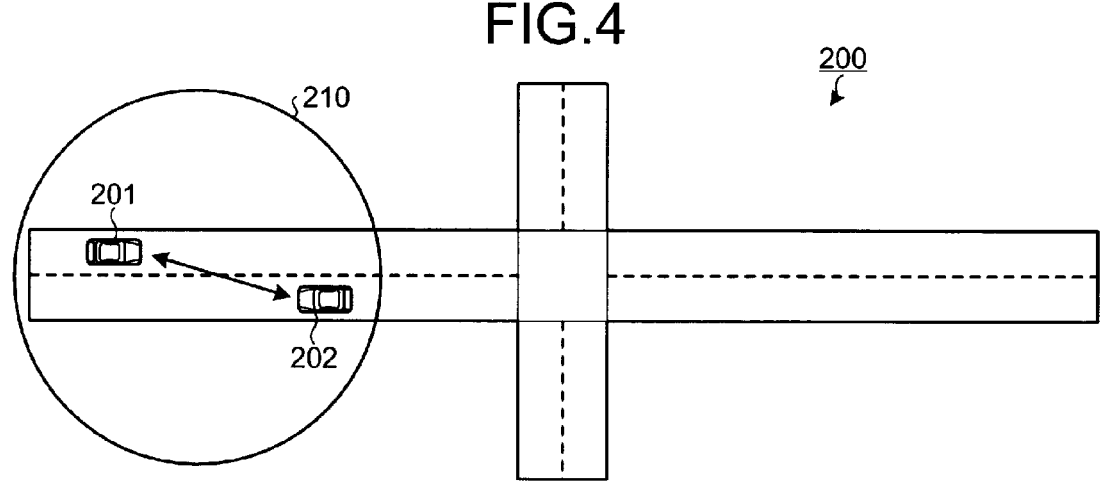
FIG. 4 is a diagram of an example of an area within the range of carrier sensing.

FIG. 4 is a diagram of an example of an area within the range of carrier sensing. In FIG. 4, portions identical to those depicted in FIG. 2 are given the same reference numerals used in FIG. 2 and description therefor is omitted. As depicted in FIG. 4, the area of the area 210 is designed to be a distance enabling the vehicles 201 and 202 in the area 210 to mutually receive and decode radio waves. As a result, carrier sensing is executed properly between the vehicles 201 and 202 in the area 210 and no hidden nodes are present. Thus, autonomous, decentralized control is executed with good efficiency.

Figure 5:
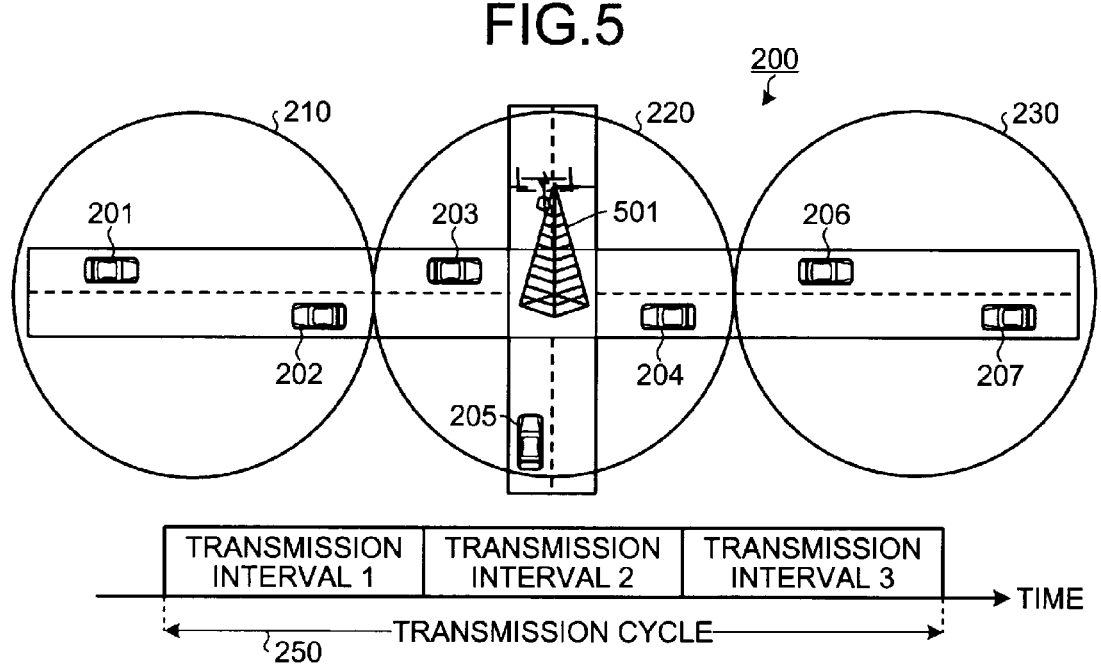
FIG. 5 is a diagram of an example of an application of a base station to the communication system.

FIG. 5 is a diagram of an example of an application of a base station to the communication system. In FIG. 5, portions identical to those depicted in FIG. 2 are given the same reference numerals used in FIG. 2 and description therefor is omitted. As depicted in FIG. 5, for example, a base station 501 may be installed in the communication system 200 in the future. The base station 501 is installed at an intersection near the center of the area 220.

For example, an even more efficient system can be built by having the base station 501 centrally manage the transmission resources in the area 220. In this case, the communication system 200 has a mixture of autonomous decentralized areas (areas 210 and 230) in which data is transmitted directly between mobile communication apparatuses and a centrally managed area (220) in which data transmission by mobile communication apparatuses is controlled by the base station 501.

In this case, when in the area 220, the vehicles 201 to 207 use transmission resources according to the instruction of the base station 501 installed in the area 220 (centralized management control); and when in the areas 210 and 230, the vehicles 201 to 207 use transmission resources autonomously selected (autonomous decentralized control). The vehicles 201 to 207 determine the type (centralized management control, autonomous decentralized control) based on vehicular position and perform handover between areas.

In the communication system 200, by installing the base station 501 in areas suitable for centralized management control (such as intersections), centralized management control can be easily implemented. Further, if the installed base station 501 is removed, autonomous decentralized control resumes in the area 220 as depicted in FIG. 2. Thus, in the communication system 200, adaption to changes in environment and circumstances can be implemented as needed.

In the communication system 200 depicted in FIG. 5, the storage unit 111 stores therein attribute information indicating for each area, whether the area is an autonomously managed area or a centrally managed area. For example, the storage unit 111 stores therein attribute information indicating that the areas 210 and 230 are autonomously managed areas, and the area 220 is a centrally managed area.

The selecting unit 113 determines whether the area deduced by the area deducing unit 112 is an autonomously managed area or a centrally managed area, based on the attribute information stored by the storage unit 111. Upon determining the area to be an autonomously managed area, the selecting unit 113 selects the transmission resource that, in the correspondence information, is correlated with the area. Upon determining the area to a centrally managed area, the selecting unit 113 selects the transmission source reported by the base station 501.

For example, the selecting unit 113 of the mobile communication apparatus 100 on the vehicle 201 deduces that the vehicle 201 is located in the area 210 and based on the attribute information, determines that the area 210 is an autonomously managed area. In this case, the selecting unit 113 selects the transmission resource 1 correlated with the area 210, in the correspondence information.

The selecting unit 113 of the mobile communication apparatus 100 on the vehicle 203 deduces that the vehicle 203 is in the area 220 and based on the attribute information, determines that the area 220 is a centrally managed area. In this case, the selecting unit 113 acquires the transmission resource reported by the base station 501 and selects the acquired transmission resource. The base station 501 manages the transmission resources used by the vehicles in the area 220 and notifies each vehicle in the area 220 which transmission resource is permitted for use.

In this way, according to the mobile communication apparatus 100 of the first embodiment, the mobile communication apparatus 100 is able to deduce the area in which the mobile communication apparatus 100 is located as well as select and use a transmission resource preliminarily correlated with the deduced area. Thus, the mobile communication apparatus 100 is able to autonomously select and use transmission resources that differ according to area. Consequently, for example, even if transmission resources for the mobile communication apparatuses 100 are not managed by the base station 501, communication loss caused by hidden nodes can be reduced. Further, since the mobile communication apparatus 100 of each vehicle can autonomously select a transmission resource, drops in the efficiency of inter-vehicular communication can be suppressed as compared to, for example, the use of RTS/CTS.

Figure 6:
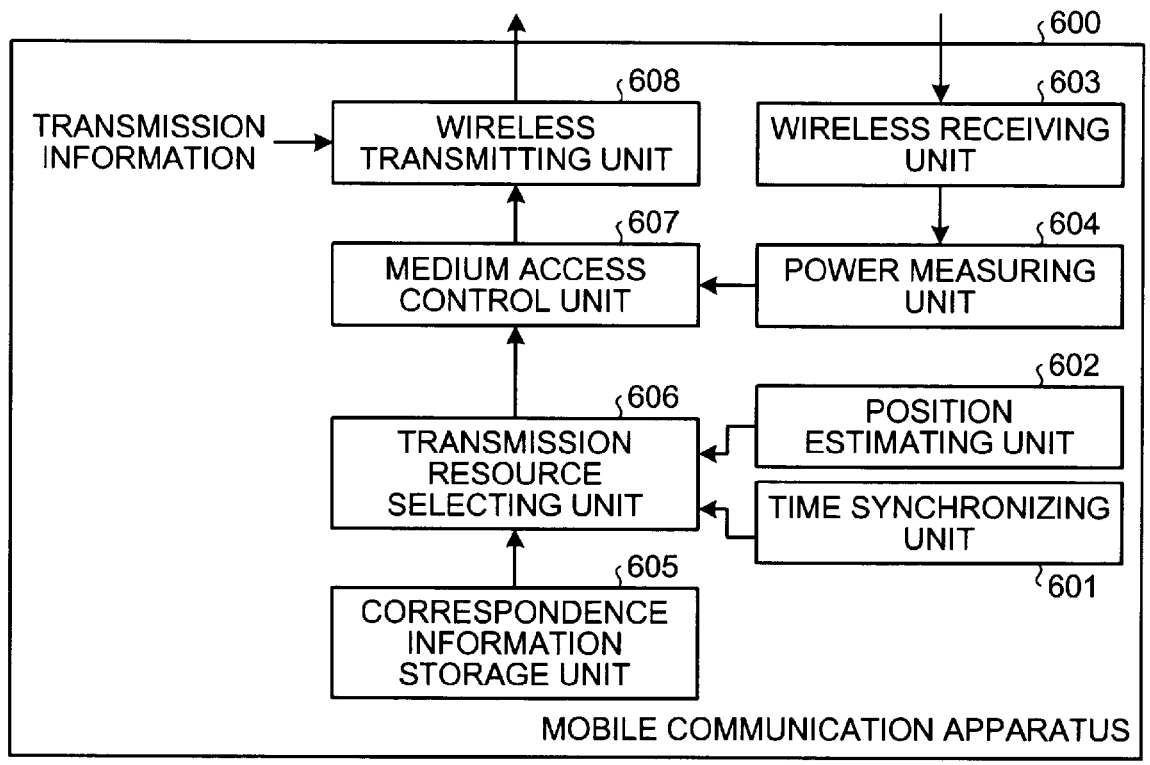
FIG. 6 is a block diagram of a mobile communication apparatus according to a second embodiment.

FIG. 6 is a block diagram of a mobile communication apparatus according to a second embodiment. As depicted in FIG. 6, a mobile communication apparatus 600 according to the second embodiment includes a time synchronizing unit 601, a position estimating unit 602, a wireless receiving unit (receiver) 603, a power measuring unit 604, a correspondence information storage unit 605, a transmission resource selecting unit 606, a medium access control unit (controller) 607, and a wireless transmitting unit (transmitter) 608. The mobile communication apparatus 600 is a mobile communication apparatus that corresponds to, for example, the mobile communication apparatus 100 depicted in FIG. 1.

The time synchronizing unit 601 acquires the current absolute time and notifies the transmission resource selecting unit 606 of the acquired absolute time. The position estimating unit 602 estimates coordinates indicating the position of the mobile communication apparatus 600 and informs the transmission resource selecting unit 606 of the estimated coordinates (coordinate information). The absolute time synchronizing unit 601 and the position estimating unit 602 may be implemented by, for example, a GPS system.

The wireless receiving unit 603 receives signals from other mobile communication apparatuses, a base station, etc. The wireless receiving unit 603 outputs received signals to the power measuring unit 604. The wireless receiving unit 603 is implemented by a wireless communication interface such as an antenna, a radio frequency (RF) circuit, etc. The power measuring unit 604 measures the power of the signal received by the wireless receiving unit 603. The power measuring unit 604 informs the medium access control unit 607 of the power of the received signal.

The correspondence information storage unit 605 is memory storing therein correspondence information correlating areas and transmission resources. The transmission resource selecting unit 606 reads information stored to the correspondence information storage unit 605 and based on the read information, selects the transmission source correlated to the area that includes the coordinates output from the position estimating unit 602, and notifies the medium access control unit 607 of the selected transmission source. The transmission resource selecting unit 606 is implemented by, for example, a processing means such as a DSP.

Further, for example if the transmission resources correlated with the areas are divided according to time, the transmission resource selecting unit 606 notifies the medium access control unit 607 of a transmission resource, based on the absolute time reported by the time synchronizing unit 601. On the other hand, if the transmission resources correlated with the areas are not divided according to time, the time synchronizing unit 601 may be omitted.

The medium access control unit 607 monitors the radio wave state of the carrier frequency, based on the power of the received signal reported by power measuring unit 604. The medium access control unit 607 controls medium access of the wireless transmitting unit 608, within a range of the transmission resource reported by the transmission resource selecting unit 606 and based on the monitored radio wave state. For example, the medium access control unit 607 controls medium access according to a CSMA/CA algorithm. The medium access control unit 607 is implemented by, for example, a processing means such as a DSP.

The wireless transmitting unit 608, according to the medium access control by the medium access control unit 607, transmits transmission information to other mobile communication apparatuses. The transmission information transmitted by the wireless transmitting unit 608 is information that indicates, for example, the position, direction of travel, speed and the state of the accelerator, brakes, blinker, etc. for the vehicle on which the mobile communication apparatus 600 is equipped. The wireless transmitting unit 608 is implemented by, for example, a wireless communication interface such as an antenna, an RF circuit, etc.

Figure 7:
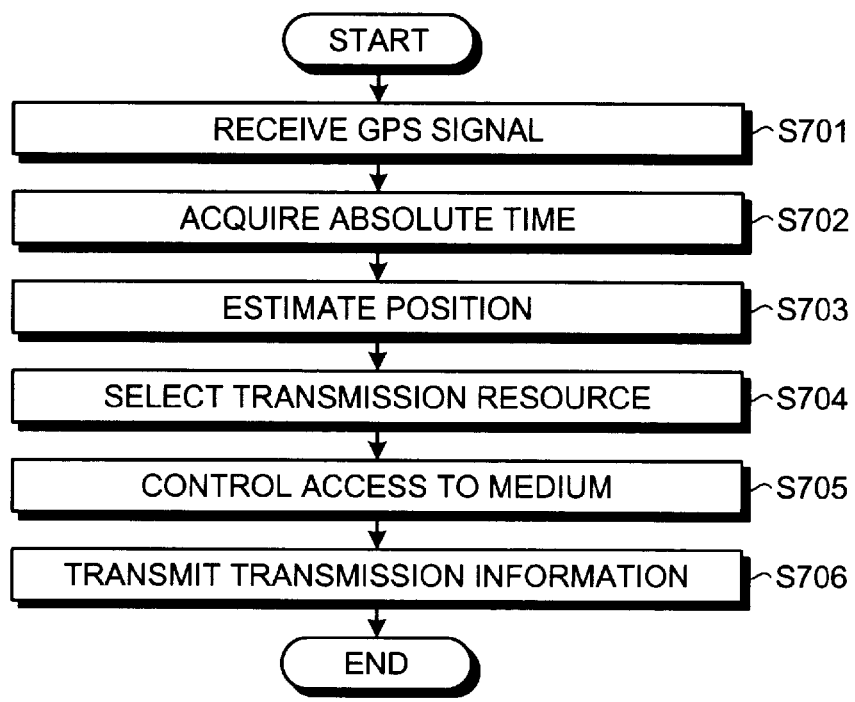
FIG. 7 is a flowchart of an example of operations performed by the mobile communication apparatus depicted in FIG. 6.

FIG. 7 is a flowchart of an example of operations performed by the mobile communication apparatus depicted in FIG. 6. The mobile communication apparatus 600 receives a GPS signal (step S701), and based on the GPS signal received at step S701, acquires the current absolute time (step S702). Based on the GPS signal received at step S701, the mobile communication apparatus 600 estimates the position of the mobile communication apparatus 600 (step S703).

Based on the position estimated at step S703, the mobile communication apparatus 600 selects a transmission resource (step S704). Based on the absolute time acquired at step S702 and within a range of the transmission resource selected at step S704, the mobile communication apparatus 600 controls medium access (step S705). According to the medium access control at step S705, the mobile communication apparatus 600 transmits transmission information (step S706), thereby ending a series of operations.

The operations above are executed, for example, for each transmission cycle (e.g., 100 [ms]). Consequently, the mobile communication apparatus 600 is able to deduce the area in which the mobile communication apparatus 600 is located, select a transmission resource preliminarily correlated with the deduced area, and transmit data using the selected transmission resource. Operations at step S702 may be executed after the operations at step S703.

Figures 8, 9:
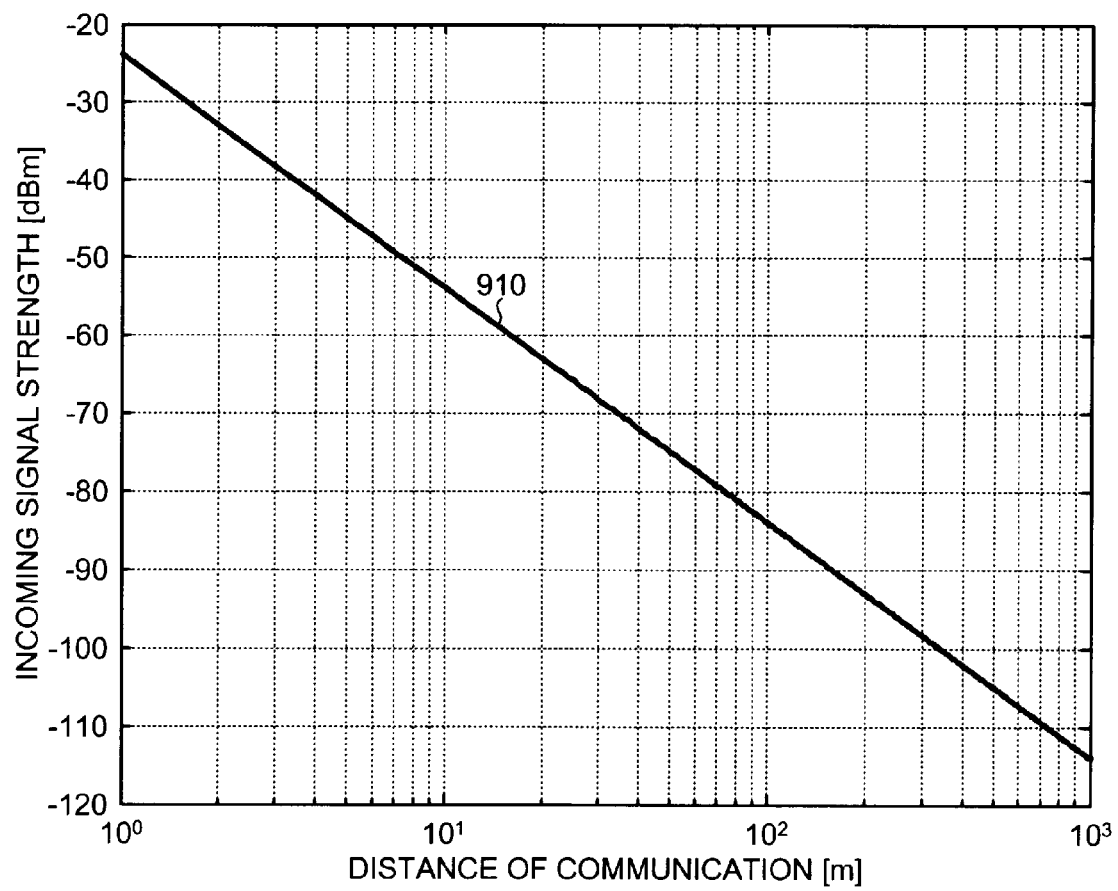
FIG. 8 is a diagram of an example of correspondence information according to the second embodiment.
FIG. 9 is a graph depicting relations between the distance of communication and incoming signal strength.

FIG. 8 is a diagram of an example of correspondence information according to the second embodiment. The correspondence information storage unit 605 depicted in FIG. 6 stores therein, for example, correspondence information 800 depicted in FIG. 8. In the correspondence information 800, areas and transmission resources R1 to RN are correlated. The areas are indicated by coordinate ranges E1 to EN.

If the areas are designed have a circular shape (e.g., refer to FIG. 2), coordinate ranges E1 to EN are, for example, information that indicates the coordinates of the respective centers of the areas and the respective radii of the areas. If the areas are designed to have a grid pattern, the coordinate ranges E1 to EN are, for example, information indicating the coordinates of the four corners of the areas. For example, if the coordinates indicating the estimated position of the mobile communication apparatus 600 are within the coordinate range E1, the mobile communication apparatus 600 selects and uses the transmission resource R1.

The correspondence information 800 is common to the mobile communication apparatuses 600 of the vehicles in the communication system 200 (refer to FIG. 2). As a result, the vehicles in the communication system 200 can autonomously select a transmission source, based on common correspondence information. Furthermore, the correspondence information 800 is, for example, preliminarily stored to the correspondence information storage unit 605 of the mobile communication apparatuses 600 equipped to the vehicles in the communication system 200.

Further, the mobile communication apparatuses 600 of the vehicles in the communication system 200 may be configured to receive the correspondence information 800 from a network and store the correspondence information 800 to the correspondence information storage unit 605. For example, the mobile communication apparatus 600 receives the correspondence information 800 as VIC information via the wireless receiving unit 603 and stores the received correspondence information 800 to the correspondence information storage unit 605.

Thus, for example, the correspondence information 800 for an area near the position of the mobile communication apparatus 600 is selected and stored to the correspondence information storage unit 605, enabling a reduction in the volume of information that is stored by the correspondence information storage unit 605. Furthermore, the latest correspondence information 800 can be received regularly and stored to the correspondence information storage unit 605, enabling highly accurate correspondence information 800 to be shared among the vehicles in the communication system 200.

A condition to enable vehicles within the same area to mutually execute carrier sensing can be related to, for example, carrier frequency, transmission strength, a propagation model, a minimum receiving sensitivity, etc. The incoming strength (Power [dBm]) of signals communicated among the vehicles can be expressed by equation 1 below, where r is the distance of communication and λ represents wavelength.

$$\text{Power} = 20 - 30\log_{10}\left(\frac{4\pi r}{\lambda}\right) \tag{1}$$

FIG. 9 is a graph depicting relations between the distance of communication and incoming signal strength. In FIG. 9, the horizontal axis represents the distance of communication between vehicles [m]; and the vertical axis represents the incoming signal strength [dBm] of a signal communicated between the vehicles. In FIG. 9, curve 910 indicates the relation of the distance r over which communication occurs and incoming signal strength, based on equation 1.

As depicted in FIG. 9, the greater the distance between vehicles (distance of communication) is, the weaker the incoming signal strength is for a signal communicated between vehicles is. Here, as one example, the carrier frequency is assumed as 700 [MHz], the transmission strength is assumed as 20 [dBm] and the propagation model, for simplicity, is assumed as the Friis transmission equation following the cube-square law. Further, the minimum reception sensitivity (the lowest incoming signal strength allowed) for carrier sensing is −100 [dBm]. In the example depicted in FIG. 9 the distance of communication is approximately 300 [m] for a minimum reception sensitivity of −100 [dBm].

Figure 10:
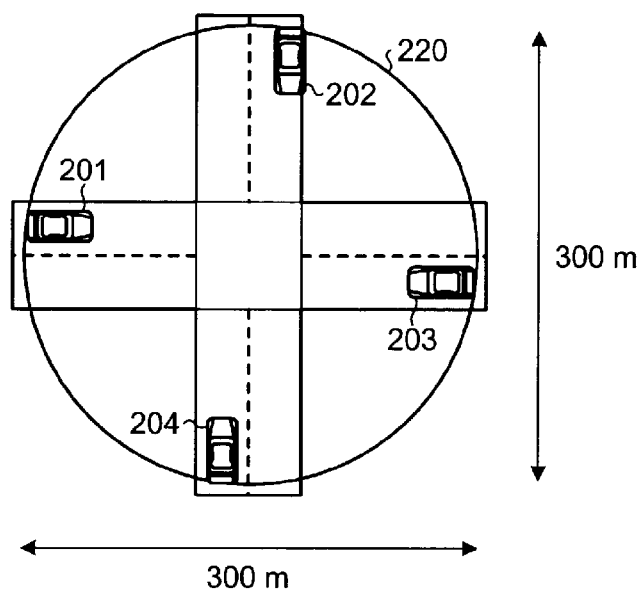
FIG. 10 is a diagram of an example of a range of an area enabling carrier sensing.

FIG. 10 is a diagram of an example of a range of an area enabling carrier sensing. As depicted in FIG. 10, the area 220 is of a circular shape having, for example, a diameter of approximately 300 [m]. Consequently, since the distance of communication among the vehicles 201 to 204 in the area 220 is 300 [m] or less, the vehicles 201 to 204 in the area 220 are able to mutually execute carrier sensing (refer to FIG. 9). Although description has been given for the area 200, the description is further applicable to other areas in the communication system 200.

Figure 11:
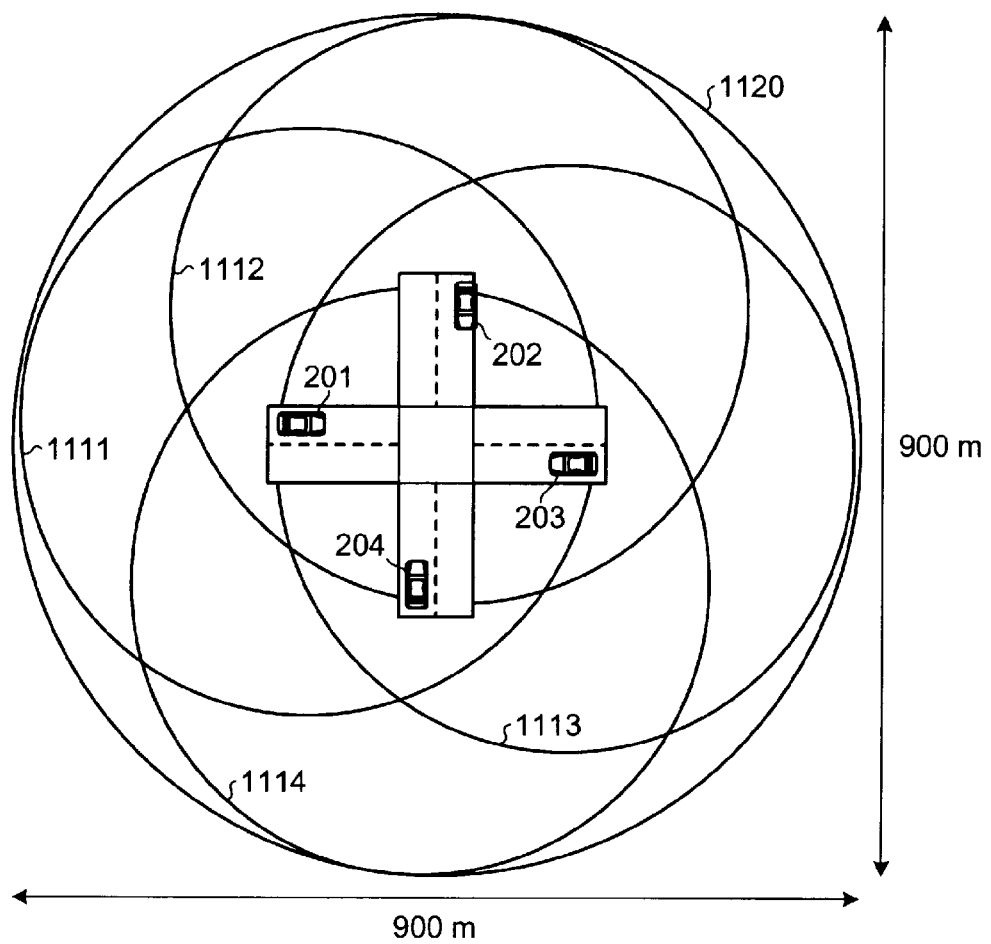
FIG. 11 is a diagram depicting ranges of radio waves transmitted from vehicles.

FIG. 11 is a diagram depicting ranges of radio waves transmitted from vehicles. In FIG. 11 portions identical to those depicted in FIG. 10 are given the same reference numerals used in FIG. 10 and description therefor are omitted. Description is given for an example where each of the vehicles 201 to 204 transmits a 20 [dBm] signal. A range 1111 indicates a range for a −100 [dBm] or greater reception sensitivity with respect to a signal from the vehicle 201. Similarly, ranges 1112 to 1114 indicate respectively ranges for a −100 [dBm] or greater reception sensitivity with respect to signals from the vehicles 202 to 204, respectively.

The range 1120 is range that encompasses the ranges 1111 to 1114 for a −100 [dBm] or greater reception sensitivity with respect to signals from the vehicles (vehicles 201 to 204) in the area 220. In this case, the diameter of the range 1120 is approximately 900 [m]. An area using the same transmission resource as the area 220 is arranged so as to not overlap the range 1120.

Figure 12:
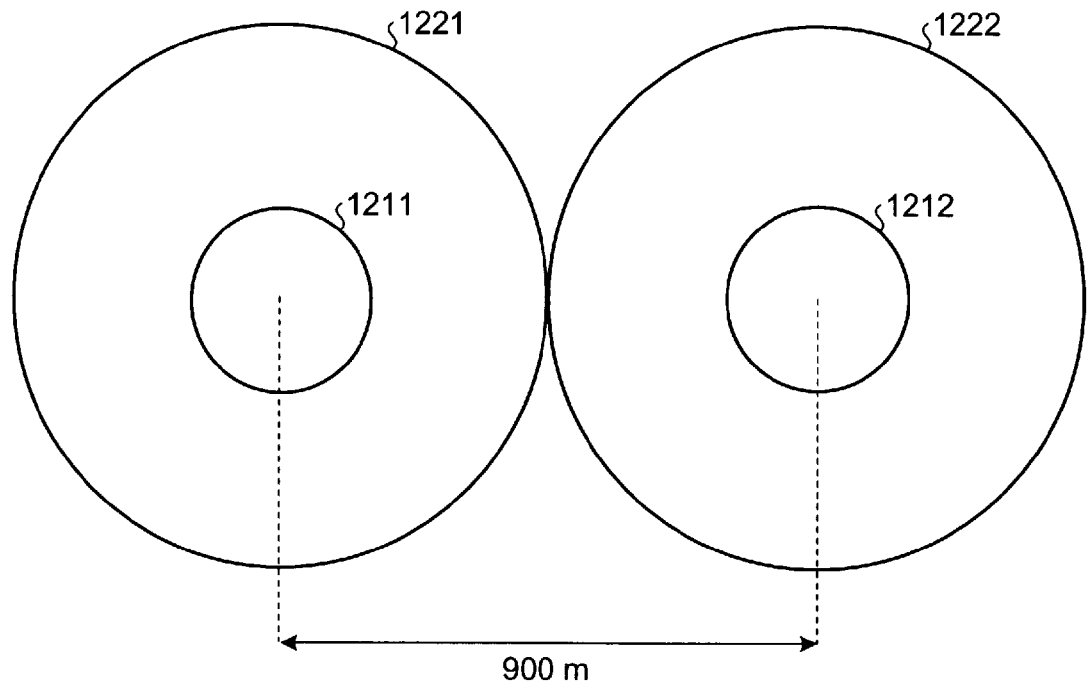
FIG. 12 is a diagram depicting the distance of communication of areas correlated with the same transmission resource.

FIG. 12 is a diagram depicting the distance of communication of areas correlated with the same transmission resource. In FIG. 12, areas 1211 and 1212 are areas that are correlated with the same transmission resource. Range 1221 is a range affected by a signal from a vehicle in the area 1211 (for example, refer to range 1120 in FIG. 11). The range 1222 is a range affected by a signal from a vehicle in the area 1212 (for example, refer to range 1120 in FIG. 11).

As depicted in FIG. 12, by distancing the respective centers of the areas 1211 and 1212 by a distance of 900 [m] or greater, the areas 1211 and 1212 can be arranged such that the ranges 1221 and 1222 do not overlap. Thus, reductions in communication loss caused by hidden nodes and the use of the same transmission resource in multiple areas become possible, thereby improving the efficiency of transmission resource utilization.

Figure 13:
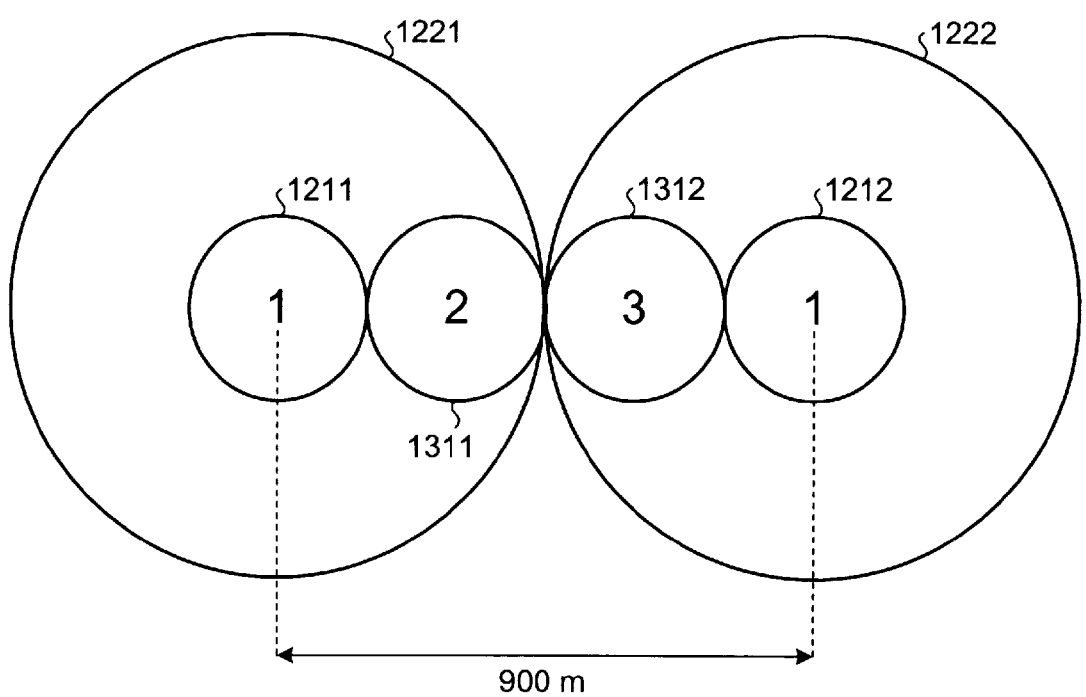
FIG. 13 is a diagram depicting an example of area arrangement and transmission resource correlation.

FIG. 13 is a diagram depicting an example of area arrangement and transmission resource correlation. In FIG. 13 portions identical to those depicted in FIG. 12 are given the same reference numerals used in FIG. 12 and description therefor is omitted. As depicted in FIG. 13, between the areas 1211 and 1212, areas 1311 and 1312 are arranged, where the transmission resource 1 is correlated with the areas 1211 and 1212. Further, the transmission resource 2 is correlated with the area 1311 and the transmission resource 3 is correlated with the area 1312.

In this way, in the correspondence information, areas (areas 1211 and 1312) adjacent to a common area (area 1311) are correlated with transmission resources that differ (transmission resources 1 and 3). Consequently, the areas (areas 1211 and 1312) in which the mobile communication apparatuses 600 respectively therein have a potential of becoming hidden nodes with respect to one another, are correlated with transmission resources (transmission resources 1 and 3) that differ.

Furthermore, in the correspondence information, areas (areas 1311 and 1212) that are adjacent to a common area (area 1312) are correlated with transmission resources (transmission resource 2 and 1) that differ. Consequently, the areas (areas 1311 and 1212) in which the mobile communication apparatuses 600 respectively therein have a potential of becoming hidden nodes with respect to one another, are correlated with transmission resources (transmission resource 2 and 1) that differ.

Figure 14:
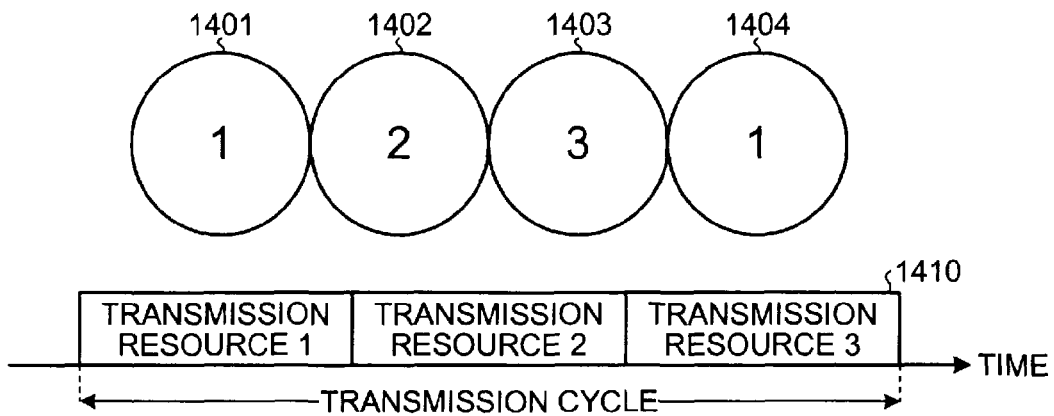
FIG. 14 is a diagram of resource division by time.

FIG. 14 is a diagram of resource division by time. In FIG. 14, areas 1401 to 1404 are, for example, the areas 1211, 1311, 1312, and 1212 depicted in FIG. 13. A transmission resource 1410 represents a transmission resource for 1 cycle (e.g., 100 [ms]) of a transmission cycle.

In FIG. 14, the horizontal axis of the transmission resource 1410 represents time. As depicted in FIG. 14, the transmission resource 1410 is time division multiplexed (TDM) (similarly for transmission intervals 1, 2, and 3 depicted in FIG. 2). The areas, in which the mobile communication apparatuses 600 therein have the potential of becoming hidden nodes with respect to one another, are correlated with transmission resources having times that differ.

For example, the areas 1401 and 1403 adjacent to the area 1402 are respectively correlated with the transmission resources 1 and 3 having times that differ. Consequently, for a vehicle in the area 1402, signal collision can be prevented with respect to signals from vehicles in the areas 1401 and 1403.

Further, the areas 1402 and 1404 adjacent to the area 1403 are respectively correlated with transmission resources having times that differ. Consequently, for vehicle in the area 1403, signal collision can be prevented with respect to signals from vehicles in the areas 1402 and 1404. Furthermore, the areas 1401 and 1404 that are not adjacent to a common area are correlated with the transmission resource 1.

Figure 15:
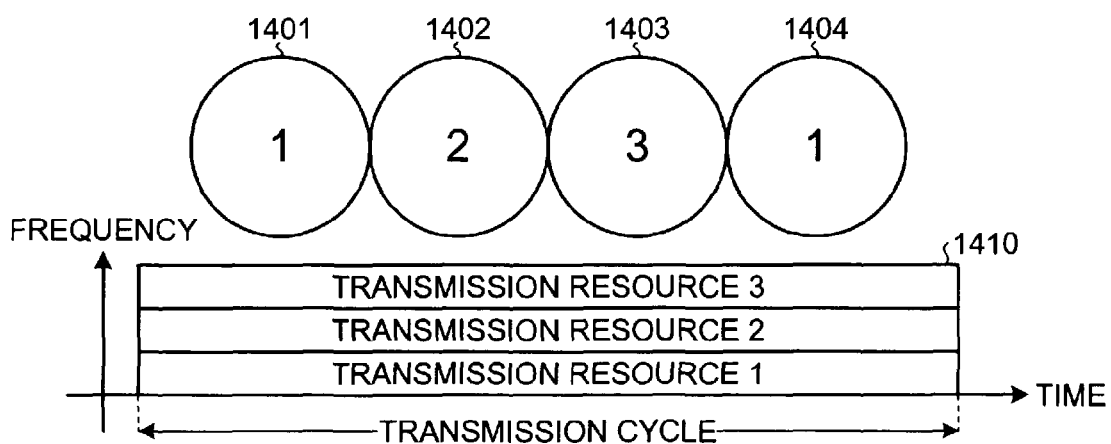
FIG. 15 is a diagram of transmission resource division by frequency.

FIG. 15 is a diagram of transmission resource division by frequency. In FIG. 15, portions identical to those depicted in FIG. 14 are given the same reference numerals used in FIG. 14 and description therefor is omitted. In FIG. 15, the horizontal axis of the transmission resource 1410 represents time, while the vertical axis represents frequency. As depicted in FIG. 15, the transmission resource 1410 may be frequency division multiplexed (FDM). In this case, the transmission resources 1, 2, and 3 are transmission resources respectively having frequencies that differ. The correspondence of the transmission resources 1, 2, and 3 to the areas 1401 to 1404 is identical to that described with reference to FIG. 14 and is thus, omitted.

Figure 16:
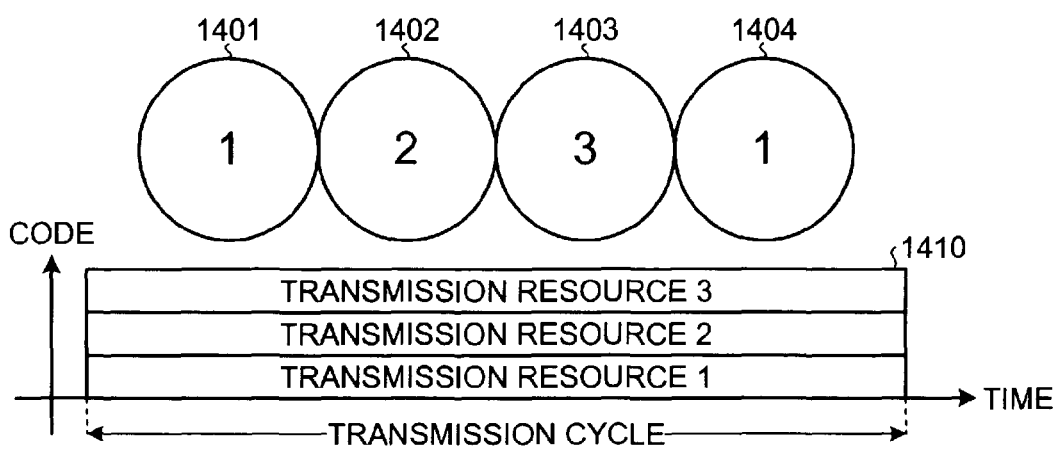
FIG. 16 is a diagram of transmission resource division by code.

FIG. 16 is a diagram of transmission resource division by code. In FIG. 16, portions identical to those depicted in FIG. 14 are given the same reference numerals used in FIG. 14 and description therefor is omitted. In FIG. 15, the horizontal axis of the transmission resource 1410 represents time, while the vertical axis represents code for code division. As depicted in FIG. 16 the transmission resource 1410 may be code division multiplexed (enabling code division multiple access (CDMA)). In this case, the transmission resources 1, 2, and 3 are transmission resources respectively having codes for code division. The correspondence of the transmission resources 1, 2, and 3 to the areas 1401 to 1404 is identical to that described with reference to FIG. 14 and is thus, omitted.

In this way, the mobile communication apparatus 600 according to the second embodiment is able to deduce the area in which the mobile communication apparatus 600 is located as well as select and use a transmission resource preliminarily correlated with the deduced area. Thus, the mobile communication apparatus 600 is able to autonomously select and use transmission resources that differ according to area. Consequently, for example, even if transmission resources for the mobile communication apparatuses 600 are not managed by a base station such as the base station 501 (refer to FIG. 5), communication loss caused by hidden nodes can be reduced. Further, since the mobile communication apparatus 600 of each vehicle can autonomously select a transmission resource, drops in the efficiency of inter-vehicular communication can be suppressed as compared to, for example, the use of RTS/CTS.

Figure 17:
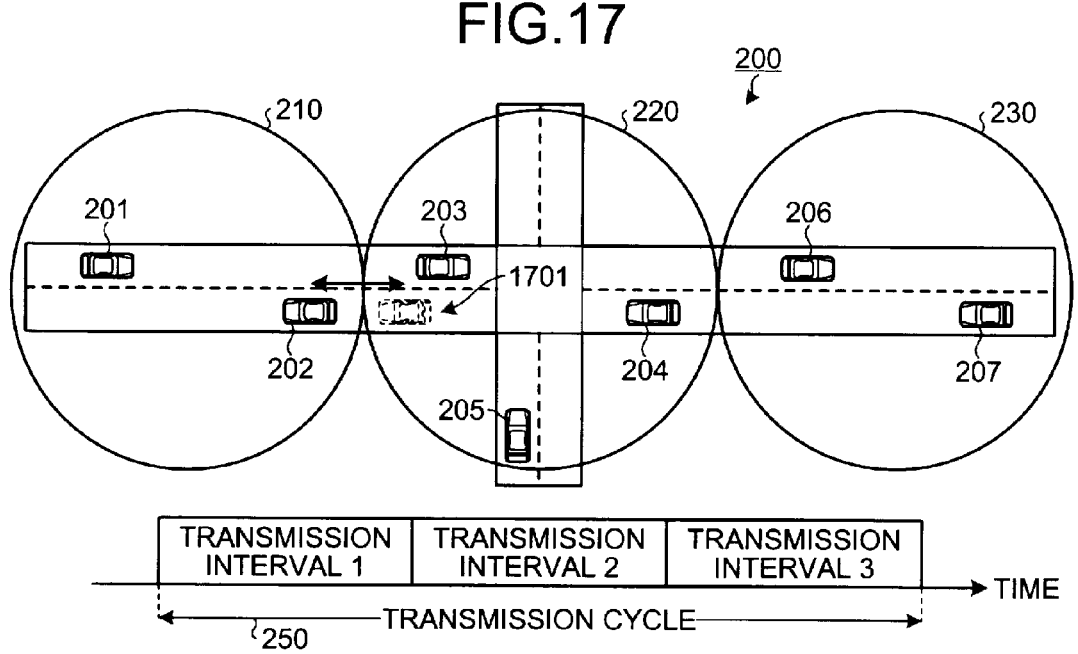
FIG. 17 is a diagram depicting packet collision caused by an error in estimating position.

Next, a third embodiment is described. FIG. 17 is a diagram depicting packet collision caused by an error in estimating position. In FIG. 17, portions identical to those depicted in FIG. 2 are given the same reference numerals used in FIG. 2 and description therefor is omitted. Presently, GPS have a margin of error ranging from meters to several tens of meters. Thus, if the position of the mobile communication apparatus is to be estimated based on a GPS signal, as depicted in FIG. 17, the vehicle 202 in the area 210 may errantly estimate the position of the vehicle 202 to be at position 1701 in the area 220. In this case, despite being in the area 210, the vehicle 202 determines that the vehicle is in the area 220 and uses the transmission interval 2 to transmit data.

Figure 18:
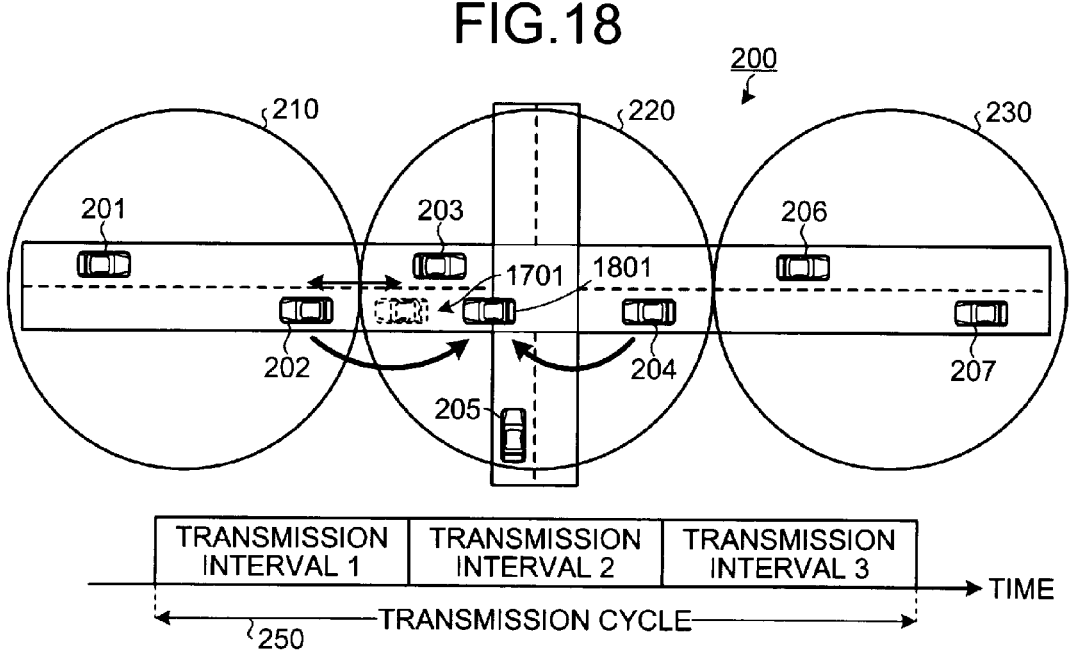
FIG. 18 is another diagram of packet collision caused by an error in estimating position.

FIG. 18 is another diagram of packet collision caused by an error in estimating position. Under the circumstances depicted in FIG. 17, for example, carrier sensing cannot be executed between the vehicles 202 and 204. Further, since both of the vehicles 202 and 204 are using the transmission interval 2 to transmit data, data respectively transmitted from the vehicles 202 and 204 collide with respect to, for example, a vehicle 1801 located in the area 220, thereby resulting in communication loss.

In this way, the vehicle 202, which is located at a position that is in the area 210 and near the border with the area 210, determines that the vehicle 202 is located in the area 220 as a result of the margin of error in estimating position and in using the transmission interval 2 correlated with the area 220, causes the problem of hidden node to occur.

Configuration of the mobile communication apparatus 600 according to the third embodiment is identical to the configuration depicted in FIG. 6 and thus, description is omitted. According to the third embodiment, the correspondence information storage unit 605 stores therein sets of correspondence information for which border portions of each area differs (refer to FIG. 21). Further, the transmission resource selecting unit 606 alternately selects each set of correspondence information stored by the correspondence information storage unit 605 and based on the selected set of correspondence information, selects a transmission resource (refer to FIG. 20).

FIG. 19 is a diagram depicting area modification by time slots. With respect to the problem of hidden node arising from a margin of error in estimating position and described with reference to FIGS. 17 and 18, for example, the arrangement of each area as depicted in FIGS. 17 and 18 and the arrangement of each area as depicted in FIG. 19 are switched between cyclically. The arrangement of each area as depicted in FIG. 19 is shifted along a horizontal direction as compared with the arrangement of each area as depicted in FIGS. 17 and 18. Consequently, in FIGS. 17 and 18, the vehicle 207 is located in the area 230 whereas in FIG. 19, the vehicle 207 is located in an area 1910 adjacent to the area 230.

For example, since the vehicle 202 is located in the area 220 with respect to the arrangement depicted n FIG. 19 and is not near a border, the mobile communication apparatus 600 can correctly deduce that the vehicle is located in the area 220. Further, the vehicle 204 is deduced to be located in the area 230 with respect to the arrangement depicted in FIG. 19. Hence, the vehicle 202 transmits data during the transmission interval 2 and the vehicle 204 transmits data during the transmission interval 3. As a result, the vehicle 1801 can receive data from the vehicle 202 and data from the vehicle 204 via transmission intervals that differ.

In this way, by cyclically changing border portions of each area, the constant occurrence of errant determination of the area in which, for example, the vehicle 202 is located can be circumvented. Thus, in the area 220, the constant inability to receive data respectively transmitted from, for example, the vehicles 202 and 204 due to collision can be circumvented. The rate at which border portions of each area is changed is set to be a sufficiently fast rate with consideration of the traveling speed of the vehicle. For example, the border portion is changed such that from the time the vehicle 201 enters the area 210 until the vehicle 201 leaves the area 210, the border portion is changed at least once.

FIG. 20 is a flowchart of an example of operations performed by the mobile communication apparatus according to the third embodiment. In FIG. 20, steps S2001 to S2003 are identical to steps S701 to S703 depicted in FIG. 7 and description therefor is omitted. The mobile communication apparatus 600, subsequent to step S2003, determines whether the seconds-unit of the current time is an even number, based on the absolute time acquired at step S2002 (step S2004).

At step S2004, if seconds-unit of the current time is an even number (step S2004: YES), the mobile communication apparatus 600 selects a transmission resource, based on the position estimated at step S2003 and correspondence information (refer to FIG. 21) for an even number of seconds (step S2005). If the seconds-unit of the current time is odd (step S2004: NO), the mobile communication apparatus 600 selects a transmission resource, based on the position estimated at step S2003 and correspondence information (refer to FIG. 21) for an odd number of seconds (step S2006).

The mobile communication apparatus 600 executes medium access control within a range of the transmission resource selected at step S2005 or step S2006 (step S2007). Next, the mobile communication apparatus 600 transmits transmission information according to the medium access control at step (step S2008), thereby ending a series of operations.

The operations above are executed, for example, for each transmission cycle (e.g., 100 [ms]). Consequently, the mobile communication apparatus 600 is able to deduce the area in which the mobile communication apparatus 600 is located, select a transmission resource preliminarily correlated with the deduced area, and transmit data using the selected transmission resource. Further, according to the current time, border portions of each area can be changed cyclically. For example, the border portions are able to be changed approximately every 1 second.

FIG. 21 is a diagram of an example of correspondence information according to the third embodiment. The correspondence information storage unit 605 (refer to FIG. 6) according to the third embodiment stores therein, for example, correspondence information 2110 and 2120 depicted in FIG. 21. The correspondence information 2110 and 2120 is information in which the border portion of each area differs. The correspondence information 2110 depicted in FIG. 20 is correspondence information for an even number of seconds whereas the correspondence information 2120 depicted in FIG. 20 is correspondence information for an odd number of seconds.

In the correspondence information 2110, coordinate ranges E11 to E1N and the transmission resources R1 to RN are correlated. In the correspondence information 2120, coordinate ranges E21 to E2N and the transmission resources R1 to RN are correlated. In this way, in the correspondence information 2110 and the correspondence information 2120, areas correlated with the same transmission resources have coordinate ranges that differ. The transmission resource selecting unit 606 depicted in FIG. 6, reads the correspondence information 2110 at step S2005 depicted in FIG. 20 and reads the correspondence information 2120 at step S2006.

In this way, the mobile communication apparatus 600 according to the third embodiment stores correspondence information (correspondence information 2110 and correspondence information 2120) in which the border portions of each area differs, alternately selects the stored correspondence information, and based on the selected correspondence information, selects a transmission resource. Consequently, the border portions of each area can be alternately changed and thus, communication loss caused by errors in estimating position can be reduced.

Although description has been given for an example in which 2 sets of correspondence information (correspondence information 2110 and correspondence information 2120) are stored in the correspondence information storage unit 605, 3 or more sets of correspondence information may be stored in the correspondence information storage unit 605. In this case, the transmission resource selecting unit 606 alternately selects each of the sets of correspondence information and based on the selected correspondence information, selects a transmission resource.

As described, according to the embodiments, communication loss can be reduced.

Although application of the mobile communication apparatuses 100 and 600 has been described with respect to a vehicle, the mobile communication apparatuses 100 and 600 are not limited to vehicular applications and can be applied to any apparatus capable of mobile communication. For example, the mobile communication apparatuses 100 and 600 can be applied to mobile phones and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication apparatus comprising:
a receiving unit that receives, as Vehicle Information and Communication Systems (VICS) information, correlation information correlating area and transmission resource;
a storage unit that stores therein the correlation information received by the receiving unit;
an area deducing unit that deduces in which area from among a plurality of areas the mobile communication apparatus is located;
a selecting unit that selects the transmission resource correlated, in the correlation information stored by the storage unit, with the area deduced by the area deducing unit; and
a transmitter that, using the transmission resource selected by the selecting unit, transmits data to a second mobile communication apparatus,
wherein if an autonomously managed area in which the data is directly transmitted between the mobile communication apparatus and the second mobile communication apparatus and a centrally managed area in which data transmission by the mobile communication apparatus and the second mobile communication apparatus is controlled by a base station are present,
the storage unit stores therein attribute information indicating for each area from among the plurality of areas, whether the area is the autonomously managed area or the centrally managed area, and
the selecting unit, based on the attribute information stored by the storage unit, determines whether the deduced area is the autonomously managed area or the centrally managed area, and upon determining the deduced area to be the autonomously managed area, selects the transmission resource correlated with the deduced area, and upon determining the deduced area to be the centrally managed area, selects a transmission resource reported by the base station.

2. The mobile communication apparatus according to claim 1, wherein the correlation information correlates a different transmission resource with each area from among the plurality of areas in which the mobile communication apparatus and the second mobile communication apparatus become hidden nodes with respect to one another.

3. The mobile communication apparatus according to claim 2, wherein the correlation information correlates with areas from among the plurality of areas, respectively, transmission resources having times that differ.

4. The mobile communication apparatus according to claim 2, wherein the correlation information correlates with areas from among the plurality of areas, respectively, transmission resources having frequencies that differ.

5. The mobile communication apparatus according to claim 2, wherein the correlation information correlates with areas from among the plurality of areas, respectively, transmission resources having codes that are for code division and that differ.

6. The mobile communication apparatus according to claim 1, wherein the correlation information correlates a different transmission resource with each area from among the plurality of areas that is adjacent to a common area.

7. The mobile communication apparatus according to claim 6, wherein the correlation information correlates with areas from among the plurality of areas, respectively, transmission resources having times that differ.

8. The mobile communication apparatus according to claim 6, wherein the correlation information correlates with areas from among the plurality of areas, respectively, transmission resources having frequencies that differ.

9. The mobile communication apparatus according to claim 6, wherein the correlation information correlates with areas from among the plurality of areas, respectively, transmission resources having codes that are for code division and that differ.

10. The mobile communication apparatus according to claim 1, wherein the correlation information correlates a same transmission resource with areas from among the plurality of areas that are not adjacent to a common area.

11. The mobile communication apparatus according to claim 1, wherein the storage unit stores therein sets of the correlation information, and the selecting unit alternately selects the sets of the correlation information and based on the selected sets of the correlation information, selects a transmission resource.

12. The mobile communication apparatus according to claim 1, further comprising:
a controller that executes medium access control within a range of a selected transmission resource selected by the selecting unit, wherein
the transmitter transmits the data, based on the medium access control executed by the controller.

13. The mobile communication apparatus according claim 12, further comprising:
a measuring unit that measures incoming signal strength of a signal from the second mobile communication apparatus, wherein
the controller executes the medium access control based on the incoming signal strength measured by the measuring unit.

14. The mobile communication apparatus according to claim 1, wherein the area deducing unit deduces the area, based on coordinate information that is for the mobile communication apparatus and received from a global positioning system.

15. A communication method for a mobile communication apparatus, comprising:
receiving, as Vehicle Information and Communication Systems (VICS) information, correlation information correlating area and transmission resource;
storing the received correlation information;
deducing in which area from among a plurality of areas the mobile communication apparatus is located;
selecting a transmission resource correlated, in the stored correlation information, with the area deduced at the deducing; and
transmitting data to a second mobile communication apparatus by using the transmission resource selected at the selecting,
wherein if an autonomously managed area in which the data is directly transmitted between the mobile communication apparatus and the second mobile communication apparatus and a centrally managed area in which data transmission by the mobile communication apparatus and the second mobile communication apparatus is controlled by a base station are present,
storing attribute information indicating for each area from among the plurality of areas, whether the area is the autonomously managed area or the centrally managed area, and
determining, based on the attribute information, whether the deduced area is the autonomously managed area or the centrally managed area, and upon determining the deduced area to be the autonomously managed area, selecting the transmission resource correlated with the deduced area, and upon determining the deduced area to be the centrally managed area, selecting a transmission resource reported by the base station.

16. A communication system comprising a plurality of mobile communication apparatuses that directly transmit data to one another, wherein
each mobile communication apparatus of the plurality of mobile communication apparatuses includes:
a receiving unit that receives, as Vehicle Information and Communication Systems (VICS) information, correlation information correlating area and transmission resource;
a storage unit that stores therein the correlation information received by the receiving unit;
an area deducing unit that deduces in which area from among a plurality of areas a mobile communication apparatus is located;
a selecting unit that selects the transmission resource correlated, in the stored correlation information, with the area deduced by the area deducing unit; and
a transmitter that, using the transmission resource selected by the selecting unit, transmits data to another mobile communication apparatus,
wherein if an autonomously managed area in which the data is directly transmitted between the mobile communication apparatus and the other mobile communication apparatus and a centrally managed area in which data transmission by the mobile communication apparatus and the other mobile communication apparatus is controlled by a base station are present,
the storage unit stores therein attribute information indicating for each area from among the plurality of areas, whether the area is the autonomously managed area or the centrally managed area, and
the selecting unit, based on the attribute information stored by the storage unit, determines whether the deduced area is the autonomously managed area or the centrally managed area, and upon determining the deduced area to be the autonomously managed area, selects the transmission resource correlated with the deduced area, and upon determining the deduced area to be the centrally managed area, selects a transmission resource reported by the base station.

* * * * *